(12) United States Patent
Araujo Da Silva et al.

(10) Patent No.: US 12,043,680 B2
(45) Date of Patent: Jul. 23, 2024

(54) ETHYLENE AND ISOPRENE COPOLYMER

(71) Applicant: COMPAGNIE GENERALE DES ETABLISSEMENTS MICHELIN, Clermont-Ferrand (FR)

(72) Inventors: José-Carlos Araujo Da Silva, Clermont-Ferrand (FR); Vincent Lafaquiere, Clermont-Ferrand (FR); Emma Moreso, Clermont-Ferrand (FR); Julien Thuilliez, Clermont-Ferrand (FR); Aurélie Triguel, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 890 days.

(21) Appl. No.: 16/972,360

(22) PCT Filed: May 27, 2019

(86) PCT No.: PCT/FR2019/051225
§ 371 (c)(1),
(2) Date: Dec. 4, 2020

(87) PCT Pub. No.: WO2019/234324
PCT Pub. Date: Dec. 12, 2019

(65) Prior Publication Data
US 2021/0230325 A1 Jul. 29, 2021

(30) Foreign Application Priority Data
Jun. 6, 2018 (FR) ........................... 1854911

(51) Int. Cl.
| *C08F 210/04* | (2006.01) |
| *B60C 1/00* | (2006.01) |
| *C08F 4/54* | (2006.01) |
| *C08F 210/02* | (2006.01) |
| *C08K 3/013* | (2018.01) |
| *C08L 9/00* | (2006.01) |
| *C08L 23/08* | (2006.01) |

(52) U.S. Cl.
CPC ............... *C08F 210/04* (2013.01); *B60C 1/00* (2013.01); *C08F 4/545* (2013.01); *C08F 210/02* (2013.01); *C08K 3/013* (2018.01); *C08L 9/00* (2013.01); *C08L 23/083* (2013.01)

(58) Field of Classification Search
CPC ...... C08F 210/04; C08F 210/02; C08F 4/545; C08L 9/00; C08L 23/083; B60C 1/00; C08K 3/013
USPC ...................................................... 526/348.6
See application file for complete search history.

(56) References Cited

U.S. PATENT DOCUMENTS

2019/0233566 A1 * 8/2019 Lafaquiere ............ C08F 236/08

FOREIGN PATENT DOCUMENTS

| CN | 101792498 A * | 8/2010 | |
| CN | 101792498 A | 8/2010 | |
| WO | 2018020123 A1 | 2/2018 | |
| WO | WO-2018020123 A1 * | 2/2018 | ............ C08F 210/02 |
| WO | 2018048533 A1 | 3/2018 | |
| WO | WO-2018048533 A1 * | 3/2018 | .............. C08F 10/02 |

OTHER PUBLICATIONS

International Search Report with Written Opinion corresponding to PCT/FR2019/051225 dated May 27, 2019.

* cited by examiner

*Primary Examiner* — Michael M. Bernshteyn
(74) *Attorney, Agent, or Firm* — Dickinson Wright PLLC

(57) ABSTRACT

A copolymer of ethylene and of isoprene, which comprises from 10 to 35 mol % of isoprene units, at least 70% of which are in the 3,4 configuration and a portion of which is in the 1,2 configuration is provided. A copolymer of this type with a reduced crystallinity is synthesized with a much higher productivity than its homologues of ethylene and of butadiene, and also confers improved curing properties on rubber compositions.

18 Claims, No Drawings

ETHYLENE AND ISOPRENE COPOLYMER

This application is a 371 national phase entry of PCT/FR2019/051225 filed on 27 May 2019, which claims benefit of French Patent Application No. 1854911, filed 6 Jun. 2018, the entire contents of which are incorporated herein by reference for all purposes.

BACKGROUND

1. Technical Field

The field of the invention is that of diene copolymers rich in ethylene units and usable as elastomers in a rubber composition for tires.

2. Related Art

The most widely used diene elastomers in the manufacture of tires are polybutadienes, polyisoprenes, in particular natural rubber, and copolymers of 1,3-butadiene and of styrene.

The point common to these elastomers is the high molar proportion of diene units in the elastomer, generally much greater than 50%, which can render them sensitive to oxidation, in particular under the action of ozone.

The applicant has described elastomers which, on the contrary, are relatively poor in diene units, in particular for the purpose of reducing their sensitivity to oxidation phenomena. These elastomers, which are for example described in documents WO 2007054223 A1 and WO 2007054224 A1, are copolymers of 1,3-butadiene and of ethylene containing more than 50 mol % of ethylene units. These elastomers are described as ethylene-rich diene elastomers.

In point of fact, it turns out that copolymers of ethylene and of 1,3-diene become crystalline when the proportion of ethylene in the copolymer becomes high. As the melting of the crystalline parts of the copolymer results in a fall in its stiffness, a rubber composition containing such a copolymer and used in a tire will also experience a decrease in its stiffness when it is brought to temperatures equaling or exceeding the melting point of the crystalline parts, which may be the case during repeated phases of braking and of acceleration of the tire. This dependency of the stiffness as a function of the temperature can thus result in uncontrolled fluctuations in the performance qualities of the tire. It is advantageous to have available diene polymers rich in ethylene units, the crystallinity of which is reduced, indeed even eliminated.

The copolymers described in document WO 2007/54224 A1 exhibit a much lower crystallinity than their homologues described in document WO 2007/54223 A1. They differ by virtue of their microstructure, in particular by virtue of the presence of 6-membered cyclic hydrocarbon-based subunits. These copolymers are prepared in the presence of a catalytic system based on a metallocene of formula (1) and an organomagnesium compound, as described for example in document WO 2007/054224 A1,

Cp$^1$ and Cp$^2$, which are identical or different, being selected from the group consisting of substituted fluorenyl groups and the unsubstituted fluorenyl group of formula C$_{13}$H$_8$, P being a group bridging the two Cp$^1$ and Cp$^2$ groups and representing a ZR$^3$R$^4$ group, Z representing a silicon or carbon atom, R$^3$ and R$^4$, which are identical or different, each representing an alkyl group comprising from 1 to 20 carbon atoms, preferably a methyl, y, an integer, being equal to or greater than 0, x, an integer or non-integer, being equal to or greater than 0, L representing an alkali metal selected from the group consisting of lithium, sodium and potassium, and N representing a molecule of an ether, preferably diethyl ether or tetrahydrofuran.

Moreover, as everyone knows, the capacity of a production unit for a given polymer is linked to the productivity of the production unit. One way to increase the productivity of a production unit involving polymerization in the presence of a catalytic system based on a metallocene is to increase the catalytic activity. This gain in catalytic activity is therefore constantly sought in order to minimize the production costs of a polymerization unit and increase its production capacity.

SUMMARY

Pursuing its aim of synthesizing ethylene-rich diene elastomers of reduced crystallinity, the applicant has discovered a new copolymer which makes it possible to solve the problems mentioned. In fact, the copolymer in accordance with the invention has reduced or even zero crystallinity and is synthesized with a much higher productivity than its ethylene and butadiene homologues. Moreover, compared to its homologues, namely the copolymers of ethylene and of butadiene, it confers improved curing properties on reinforced rubber compositions.

Thus, a first subject of the invention is a copolymer, in particular an elastomer, of ethylene and of isoprene, which copolymer comprises from 10 to 35 mol % of isoprene units, at least 70% of which are in the 3,4 configuration and a portion of which is in the 1,2 configuration.

Another subject of the invention is a process for preparing the copolymer of ethylene and of isoprene in accordance with the invention, which comprises the copolymerization of ethylene and of isoprene in the presence of a catalytic system based at least on a metallocene of formula (I) and on an organomagnesium compound of formula (II):

Cp$^1$ and Cp$^2$, which are identical or different, being selected from the group consisting of substituted fluorenyl groups and the unsubstituted fluorenyl group of formula C$_{13}$H$_8$, P being a group bridging the two Cp$^1$ and Cp$^2$ groups and representing a ZR$^3$R$^4$ group, Z representing a silicon or carbon atom, R$^3$ and R$^4$, which are identical or different, each representing an alkyl group comprising from 1 to 20 carbon atoms, preferably a methyl, y, which is an integer, being equal to or greater than 0, x, which is or is not an integer, being equal to or greater than 0, L representing an alkali metal selected from the group consisting of lithium, sodium and potassium, N representing a molecule of an ether, preferably diethyl ether or tetrahydrofuran, R$^1$ and R$^2$, which are identical or different, representing a carbon group.

The invention also relates to a rubber composition which comprises the elastomer in accordance with the invention, and also a tire which comprises the rubber composition in accordance with the invention.

I. DETAILED DESCRIPTION

In the present description, any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The expression "based on" used to define the constituents of a catalytic system or of a composition is understood to mean the mixture of these constituents, or the product of the reaction of a portion or of all of these constituents with one another.

Unless otherwise indicated, the contents of the units resulting from the insertion of a monomer into the copolymer are expressed as molar percentage with respect to all of the monomer units of the copolymer.

The compounds mentioned in the description can be of fossil origin or be biobased. In the latter case, they can result, partially or completely, from biomass or be obtained from renewable starting materials resulting from biomass. The monomers are concerned in particular.

Since isoprene is a substituted 1,3 diene, isoprene can polymerize and give rise to units of the 1,2 configuration, 3,4 configuration and 1,4 configuration, respectively of formula —(CH$_2$—CMe(CH=CH$_2$))—, —(CH$_2$—CH(CMe=CH$_2$))— and —(CH$_2$—CMe=CH—CH$_2$)—.

As is also well known, the ethylene unit is a unit of —(CH$_2$—CH$_2$)— subunit.

The copolymer in accordance with the invention is a copolymer of ethylene and of isoprene, which implies that the monomer units of the copolymer are units resulting from the polymerization of ethylene and of isoprene.

The copolymer of ethylene and of isoprene in accordance with the invention has the essential characteristic of comprising from 10 to 35 mol % of isoprene units, the copolymer then comprising from 65 to 90 mol % of ethylene units. Preferably, the isoprene units represent from 15 to 30 mol % of the monomer units of the copolymer, i.e. the isoprene units represent from 15 to 30 mol % of the isoprene units and of the ethylene units of the copolymer.

In the copolymer according to the invention, at least 70 mol % of the isoprene units are in the 3,4 configuration. Isoprene units other than isoprene units in the 3,4 configuration can be in one of the 1,2 and 1,4 configurations, in particular 1,4-trans configuration.

Another essential characteristic of the copolymer in accordance with the invention is also that it contains isoprene units in the 1,2 configuration.

The isoprene units in the 3,4 configuration and the isoprene units in the 1,2 configuration therefore represent more than 70 mol % of the isoprene units of the copolymer. In other words, the isoprene units, whether they are of 1,2 or 3,4 configuration, represent more than 70 mol % of the isoprene units. Preferentially, the isoprene units in the 3,4 configuration and the isoprene units in the 1,2 configuration represent at least 75 mol % of the isoprene units of the copolymer, which amounts to saying that the isoprene units, whether they are of 1,2 or 3,4 configuration, represent at least 75 mol % of the isoprene units.

According to any one of the embodiments of the invention, the molar content of isoprene units in the 3,4 configuration in the copolymer is preferentially more than 3 times greater than the molar content of isoprene units in the 1,4 configuration in the copolymer.

According to one embodiment of the invention, the copolymer contains isoprene units in the 1,4-trans configuration, which implies that the molar content of isoprene units in the 1,4-trans configuration is greater than 0.

According to any one of the embodiments of the invention, the copolymer is preferentially a random copolymer.

Preferably, the copolymer in accordance with the invention is an elastomer.

The copolymer, in particular when it is an elastomer, preferentially has a glass transition temperature of less than −35° C., more preferentially of between −60° C. and −35° C., even more preferentially of between −55° C. and −40° C.

The copolymer in accordance with the invention can be prepared by a process which comprises the copolymerization of ethylene and of isoprene in the presence of a catalytic system based at least on a metallocene of formula (I) and on an organomagnesium compound of formula (II):

$$P(Cp^1)(Cp^2)Nd(BH_4)_{(1+y)}L_y\text{-}N_x \qquad (I)$$

$$MgR^1R^2 \qquad (II)$$

Cp$^1$ and Cp$^2$, which are identical or different, being selected from the group consisting of substituted fluorenyl groups and the unsubstituted fluorenyl group of formula C$_{13}$H$_8$, P being a group bridging the two Cp$^1$ and Cp$^2$ groups and representing a ZR$^3$R$^4$ group, Z representing a silicon or carbon atom, R$^3$ and R$^4$, which are identical or different, each representing an alkyl group comprising from 1 to 20 carbon atoms, preferably a methyl, y, which is an integer, being equal to or greater than 0, x, which is or is not an integer, being equal to or greater than 0, L representing an alkali metal selected from the group consisting of lithium, sodium and potassium, N representing a molecule of an ether, preferably diethyl ether or tetrahydrofuran, R$^1$ and R$^2$, which are identical or different, representing a carbon group.

Mention may be made, as substituted fluorenyl groups, of those substituted by alkyl radicals having from 1 to 6 carbon atoms or by aryl radicals having from 6 to 12 carbon atoms. The choice of the radicals is also guided by the accessibility to the corresponding molecules, which are the substituted fluorenes, because the latter are commercially available or can be easily synthesized.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the positions of the carbon atoms of the rings as represented in the scheme below, the 9 position corresponding to the carbon atom to which the bridge P is attached.

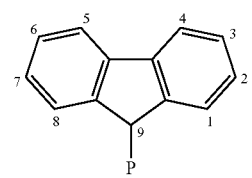

The catalytic system can be prepared conventionally by a process analogous to that described in document WO 2007/

054224 A1. For example, the dialkylmagnesium and the metallocene can be reacted in a hydrocarbon-based solvent typically at a temperature ranging from 20 to 80° C. for a period of time of between 5 and 60 minutes. The catalytic system is generally prepared in an aliphatic hydrocarbon-based solvent, such as methylcyclohexane, or an aromatic hydrocarbon-based solvent, such as toluene. Generally, after its synthesis, the catalytic system is used in this form in the process for the synthesis of the copolymer in accordance with the invention.

The metallocene used for preparing the catalytic system can be in the form of a crystalline or non-crystalline powder, or else in the form of single crystals. The metallocene can be provided in a monomer or dimer form, these forms depending on the method of preparation of the metallocene, as for example is described in application WO 2007/054224 A1. The metallocene can be prepared conventionally by a process analogous to that described in document WO 2007/054224 A1, in particular by reaction, under inert and anhydrous conditions, of the salt of an alkali metal of the ligand with a rare earth metal borohydride in a suitable solvent, such as an ether, for example diethyl ether or tetrahydrofuran, or any other solvent known to those skilled in the art. After reaction, the metallocene is separated from the reaction by-products by the techniques known to those skilled in the art, such as filtration or precipitation from a second solvent. In the end, the metallocene is dried and isolated in the solid form.

Like any synthesis carried out in the presence of an organometallic compound, the synthesis of the metallocene and that of the catalytic system take place under anhydrous conditions under an inert atmosphere. Typically, the reactions are carried out starting from anhydrous solvents and compounds under anhydrous nitrogen or argon.

Preferably, the metallocene is of formula (Ia), (Ib), (Ic), (Id) or (Ie), in which the symbol Flu presents the fluorenyl group of formula $C_{13}H_8$.

$$[\{Me_2SiFlu_2Nd(\mu\text{-}BH_4)_2Li(THF)\}_2] \quad (Ia)$$

$$[Me_2SiFlu_2Nd(\mu\text{-}BH_4)_2Li(THF)] \quad (Ib)$$

$$[Me_2SiFlu_2Nd(\mu\text{-}BH_4)(THF)] \quad (Ic)$$

$$[\{Me_2SiFlu_2Nd(\mu\text{-}BH_4)(THF)\}_2] \quad (Id)$$

$$[Me_2SiFlu_2Nd(\mu\text{-}BH_4)] \quad (Ie)$$

The organomagnesium compound of use for the requirements of the invention is of formula $MgR^1R^2$ in which $R^1$ and $R^2$, which are identical or different, represent a carbon group. Carbon group is understood to mean a group which contains one or more carbon atoms. Preferably, $R^1$ and $R^2$ contain from 2 to 10 carbon atoms. More preferentially, $R^1$ and $R^2$ each represent an alkyl. The organomagnesium compound is advantageously a dialkylmagnesium compound, better still butylethylmagnesium or butyloctylmagnesium, even better still butyloctylmagnesium.

According to any one of the embodiments of the invention, the molar ratio of the organomagnesium compound to the metal Nd constituting the metallocene is preferably within a range extending from 1 to 100, more preferably is greater than or equal to 1 and less than 10. The range of values extending from 1 to less than 10 is in particular more favourable for obtaining copolymers of high molar masses. According to any one of the embodiments of the invention, the copolymers in accordance with the invention preferably have a polydispersity index of less than 3.

Those skilled in the art also adapt the polymerization conditions and the concentrations of each of the reactants (constituents of the catalytic system, monomers) according to the equipment (devices, reactors) used to carry out the polymerization and the various chemical reactions. As is known to those skilled in the art, the copolymerization and the handling of the monomers, of the catalytic system and of the polymerization solvent(s) take place under anhydrous conditions and under an inert atmosphere. The polymerization solvents are typically aliphatic or aromatic hydrocarbon-based solvents.

The polymerization is preferably carried out in solution, continuously or batchwise. The polymerization solvent can be an aromatic or aliphatic hydrocarbon-based solvent. Mention may be made, as example of polymerization solvent, of toluene and methylcyclohexane. The monomers can be introduced into the reactor containing the polymerization solvent and the catalytic system or, conversely, the catalytic system can be introduced into the reactor containing the polymerization solvent and the monomers. The polymerization is typically carried out under anhydrous conditions and in the absence of oxygen, in the optional presence of an inert gas. The polymerization temperature generally varies within a range extending from 30° C. to 150° C., preferably from 30° C. to 120° C.

Typically, the catalytic system is placed in the presence of a mixture of ethylene and isoprene, the relative proportion of each of the monomers being selected by those skilled in the art as a function of the desired proportion of ethylene unit and of isoprene unit in the copolymer. The relative proportion of each of the monomers in the polymerization medium can also be adjusted by those skilled in the art during the polymerization according to the relative consumption of said monomers, in particular when the synthesis of a random copolymer is desired. The ethylene and isoprene are preferentially continuously added during the copolymerization.

The polymerization can be halted by cooling the polymerization medium. The polymer can be recovered according to conventional techniques known to those skilled in the art, such as, for example, by precipitation, by evaporation of the solvent under reduced pressure or by steam stripping.

The copolymer in accordance with the invention, when it is an elastomer, can be used in a rubber composition.

The rubber composition, which is another subject of the invention, has the characteristic of comprising the elastomer in accordance with the invention. Preferably, it also contains a crosslinking system.

The crosslinking system can be based on sulfur, on sulfur donors, on peroxides, on bismaleimides or on mixtures thereof. The crosslinking system is preferentially a vulcanization system, that is to say a system based on sulfur (or on a sulfur donor) and on a primary vulcanization accelerator. Added to this base vulcanization system are various known secondary vulcanization accelerators or vulcanization activators, such as zinc oxide, stearic acid or equivalent compounds, or guanidine derivatives (in particular diphenylguanidine), or also known vulcanization retarders. The composition of the crosslinking system and the proportion of the crosslinking system in the rubber composition are adjusted by those skilled in the art depending on the use of the rubber composition.

According to a preferential embodiment of the invention, the rubber composition comprises a reinforcing filler. The rubber composition can comprise any type of "reinforcing" filler known for its abilities to reinforce a rubber composition which can be used for the manufacture of tires, for example an organic filler, such as carbon black, a reinforcing inorganic filler, such as silica, with which is combined, in a known way, a coupling agent, or also a mixture of these two types of filler. Such a reinforcing filler typically consists of nanoparticles, the (weight-) average size of which is less than a micrometre, generally less than 500 nm, most often between 20 and 200 nm, in particular and more preferentially between 20 and 150 nm. The content of reinforcing filler is adjusted by those skilled in the art according to the use of the rubber composition.

The rubber composition can additionally contain other additives known to be used in rubber compositions for tires, such as plasticizers, antiozonants or antioxidants.

The rubber composition in accordance with the invention is typically manufactured in appropriate mixers, using two successive phases of preparation well known to those skilled in the art: a first phase of thermomechanical working or kneading ("non-productive" phase) at high temperature, up to a maximum temperature of between 130° C. and 200° C., followed by a second phase of mechanical working ("productive" phase) up to a lower temperature, typically of less than 110° C., for example between 40° C. and 100° C., during which finishing phase the crosslinking system is incorporated.

The rubber composition in accordance with the invention, which can be either in the raw state (before crosslinking or vulcanization) or in the cured state (after crosslinking or vulcanization), can be used in a tire semi-finished article.

A better understanding of the abovementioned characteristics of the present invention, and also others, will be obtained on reading the following description of several implementational examples of the invention, given by way of illustration and without limitation.

II. IMPLEMENTATIONAL EXAMPLES OF THE INVENTION

All the reactants are obtained commercially, except the metallocenes [{Me$_2$SiFlu$_2$Nd(μ-BH$_4$)$_2$Li(THF)}] (metallocene A) and [{Me$_2$SiCpFluNd(μ-BH$_4$)$_2$Li(THF)}] (metallocene B), which are prepared according to the procedures described in the respective documents WO 2007/054224 and WO 2007/054223, Cp and Flu representing respectively the C$_5$H$_4$ and C$_{13}$H$_8$ groups.

The butyloctylmagnesium BOMAG (20% in heptane, C=0.88 mol·l$^{-1}$) originates from Chemtura and is stored in a Schlenk tube under an inert atmosphere. The ethylene, of N35 grade, originates from Air Liquide and is used without prepurification. The isoprene and the 1,3-butadiene are purified by passage over alumina guards.

1) Determination of the Microstructure of the Copolymers:

The spectral characterization and the measurements of the microstructure of the copolymers of ethylene and of isoprene are carried out by nuclear magnetic resonance (NMR) spectroscopy.

Spectrometer: For these measurements, a Bruker Avance III HD 500 MHz spectrometer is used, equipped with a Bruker cryo-BBFO z-grad 5 mm probe.

Experiments: The $^1$H experiments are recorded using a radiofrequency pulse with a tilt angle of 30°, the number of repetitions is 128 with a recycle delay of 5 seconds. The HSQC (Heteronuclear Single Quantum Coherence) and HMBC (Heteronuclear Multiple-Bond Correlation) $^1$H-$^{13}$C NMR correlation experiments are recorded with a number of repetitions of 128 and a number of increments of 128. The experiments are carried out at 25° C.

Preparation of the sample: 25 mg of sample are dissolved in 1 ml of deuterated chloroform (CDCl$_3$).

Calibration of the sample: The axes of the $^1$H and $^{13}$C chemical shifts are calibrated with respect to the protonated impurity of the solvent (CHCl$_3$) at $\delta_{1H}$=7.2 ppm and $\delta_{13C}$=77 ppm.

Spectral assignment: The $^1$H chemical shifts of the characteristic signals of this matrix are presented in Table 1.

TABLE 1

Assignment of the $^1$H signals of the Ethylene/Isoprene copolymers

| subunit | structure | $\delta_{1H}$ (ppm) |
| --- | --- | --- |
| PI 1-2 | —[CH$_2$—CMe(CH=CH$_2$)]— | 5.68-5.52 |
| PI 1-4 (cis and trans) | —[CH$_2$—CMe=CH—CH$_2$]— | 5.40-4.92 |
| PI 3-4 + PI 1-2 | —[CH$_2$—CH(CMe=CH$_2$)]—<br>—[CH$_2$—CMe(CH=CH$_2$)]— | 4.92-4.34 |
| PE | —[CH$_2$—CH$_2$]— | 1.18 |

Microstructure of the copolymers of ethylene and of isoprene: The quantifications are carried out from the integration of the signals of the 1D $^1$H NMR spectra presented in Table 1, using the Topspin software. The microstructure is determined in molar percentage (molar %) as follows:

molar % of a subunit=normalized $^1$H integral of a subunit×100/Σ(normalized $^1$H integrals of each subunit)

The microstructure of the copolymers of ethylene and of 1,3-butadiene is determined according to the method described in documents WO 2007/054223 A1 and WO 2007/054224 A1.

2) Determination of the Degree of Crystallinity of the Copolymers:

Standard ISO 11357-3:2011 is used to determine the temperature and enthalpy of fusion and of crystallization of the polymers used by differential scanning calorimetry (DSC). The reference enthalpy of polyethylene is 277.1 J/g (according to Polymer Handbook, 4th Edition, J. Brandrup, E. H. Immergut and E. A. Grulke, 1999).

3) Determination of the Stiffness of the Copolymers:

The measurements are carried out on an Anton Paar model MCR301 rheometer in shear mode with cylindrical test specimens of controlled geometry (thickness of between 1.5 mm and 3 mm and diameter of between 22 mm and 28 mm). The sample is subjected to a sinusoidal shear stress, at a fixed temperature (corresponding to the end of the passage of the glass transition of the elastomer over a temperature sweep at 10 Hz), and over a frequency range extending from 0.01 Hz to 100 Hz. The stiffness value selected as being the stiffness of the rubbery plateau of the sample is the value of the shear modulus G' for the frequency at which the loss modulus G" reaches its minimum, in accordance with the method described by C. Liu, J. He, E. van Ruymbeke, R. Keunings and C. Bailly, Evaluation of different methods for the determination of the plateau modulus and the entanglement molecular weight, Polymer, 47 (2006), 4461-4479.

4) Determination of the Glass Transition Temperature of the Copolymers:

The glass transition temperature is measured by means of a differential calorimeter (differential scanning calorimeter) according to Standard ASTM D3418 (1999).

5) Determination of the Macrostructure of the Copolymers by Size Exclusion Chromatography (SEC):

a) Principle of the Measurement:

Size exclusion chromatography or SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses (Mn) and weight-average molar masses (Mw) may be determined from commercial standards and the polydispersity index (PI=Mw/Mn) may be calculated via a "Moore" calibration.

b) Preparation of the Polymer:

There is no specific treatment of the polymer sample before analysis. The latter is simply dissolved in (tetrahydrofuran+0.1 vol % of distilled water) at a concentration of approximately 1 g/l. The solution is then filtered through a filter with a porosity of 0.45 µm before injection.

c) Sec Analysis:

The apparatus used is a Waters Alliance chromatograph. The elution solvent is tetrahydrofuran, the flow rate is 0.7 ml/min, the temperature of the system is 35° C. and the analytical time is 90 min. A set of four Waters columns in series, with commercial names Styragel HMW7, Styragel HMW6E and two Styragel HT6E, is used.

The volume of the solution of the polymer sample injected is 100 The detector is a Waters 2410 differential refractometer and the software for making use of the chromatographic data is the Waters Empower system.

The calculated average molar masses are relative to a calibration curve produced from PSS Ready Cal-Kit commercial polystyrene standards.

6) Rheometry:

The measurements are carried out at 140° C. with an oscillating disc rheometer, according to Standard DIN 53529—Part 3 (June 1983). The change in the rheometric torque as a function of the time describes the change in the stiffening of the composition as a result of the vulcanization reaction. The measurements are processed according to Standard DIN 53529—Part 2 (March 1983). The measurements are processed according to Standard DIN 53529—Part 2 (March 1983). Tα (for example T90) is the time necessary to achieve a conversion of α%, that is to say α% (for example 90%) of the difference between the minimum and maximum torques. The result for a given composition is expressed by the ratio of the Tα of the given composition to that of a control composition, the ratio being multiplied by 100.

7) Synthesis of Copolymers of Ethylene and of 1,3-Butadiene:

Three copolymers of ethylene and of 1,3-butadiene with a high ethylene content, respectively the copolymers A, B1 and B2, known from the prior art, were prepared. The copolymer A is prepared in the presence of a catalytic system based on the metallocene A [Me$_2$SiCpFluNd(µ-BH$_4$)$_2$Li (THF)] and the copolymers B1 and B2 are prepared in the presence of a catalytic system based on the metallocene B [Me$_2$Si(Flu)$_2$Nd(µ-BH$_4$)$_2$Li(THF)] according to the procedures described in documents WO 2007/054223 and WO 2007/054224.

7.1—Synthesis of the Copolymer A: Example 1

The polymer is synthesized according to the following procedure:

The cocatalyst, the butyloctylmagnesium (BOMAG) and then the metallocene A [Me$_2$SiCpFluNd(µ-BH$_4$)$_2$Li(THF)] are added to a 500-ml glass reactor containing 300 ml of toluene. The alkylation time is 10 minutes and the reaction temperature is 20° C. The respective amounts of the constituents of the catalytic system appear in Table 1.

Subsequently, the monomers are added according to the respective proportions shown in Table 1, the ethylene (Eth) and the 1,3-butadiene (Bde) being in the form of a gaseous mixture. The polymerization is carried out at 80° C. and at a constant pressure of 4 bar.

The polymerization reaction is halted by cooling, degassing of the reactor and addition of ethanol. An antioxidant is added to the polymer solution. The copolymer is recovered by drying in an oven under vacuum to constant weight. The weight weighed makes it possible to determine the mean catalytic activity of the catalytic system, expressed in kilograms of polymer synthesized per mole of neodymium metal and per hour (kg/mol·h).

7.2—Synthesis of the Copolymer B1: Example 2

The cocatalyst, the butyloctylmagnesium (BOMAG) and then the metallocene B [Me$_2$Si(Flu)$_2$Nd(µ-BH$_4$)$_2$Li(THF)] are added to a 500-ml glass reactor containing 300 ml of methylcyclohexane. The alkylation time is 10 minutes and the reaction temperature is 20° C. The respective amounts of the constituents of the catalytic system appear in Table 1.

Subsequently, the monomers are added according to the respective proportions shown in Table 1, the ethylene (Eth) and the 1,3-butadiene (Bde) being in the form of a gaseous mixture. The polymerization is carried out at 80° C. and at a constant pressure of 4 bar.

The polymerization reaction is halted by cooling, degassing of the reactor and addition of ethanol. An antioxidant is added to the polymer solution. The copolymer is recovered by drying in an oven under vacuum to constant weight. The weight weighed makes it possible to determine the mean catalytic activity of the catalytic system, expressed in kilograms of polymer synthesized per mole of neodymium metal and per hour (kg/mol·h).

7.3—Synthesis of the Copolymer B2: Example 3

The cocatalyst, the butyloctylmagnesium (BOMAG) and then metallocene B are added to a reactor containing methylcyclohexane. The alkylation time is 10 minutes, the reaction temperature is 20° C. The respective amounts of the constituents of the catalytic system are shown in Table 1.

The monomers are then added continuously in the respective amounts shown in Table 1. The polymerization is carried out under the conditions of constant temperature and pressure also indicated in Table 1. The polymerization reaction is halted by cooling, degassing of the reactor and addition of ethanol. An antioxidant is added to the polymer solution. The copolymer is recovered by drying in an oven under vacuum to constant weight. The weight weighed makes it possible to determine the mean catalytic activity of the catalytic system, expressed in kilograms of polymer synthesized per mole of neodymium metal and per hour (kg/mol·h).

8—Synthesis of Copolymers of Ethylene and of Isoprene: Examples 4 to 6

The copolymers 1 to 3 in accordance with the invention are synthesized according to the following procedure:

The cocatalyst, the butyloctylmagnesium (BOMAG) and then metallocene B are added to a reactor containing methylcyclohexane. The alkylation time is 10 minutes, the reaction temperature is 20° C. The respective amounts of the constituents of the catalytic system are shown in Table 1.

The monomers are then added continuously in the respective amounts shown in Table 1. The polymerization is carried out under the conditions of constant temperature and pressure also indicated in Table 1. The polymerization reaction is halted by cooling, degassing of the reactor and addition of ethanol. An antioxidant is added to the polymer solution. The copolymer is recovered by drying in an oven under vacuum to constant weight. The weight weighed makes it possible to determine the mean catalytic activity of the catalytic system, expressed in kilograms of polymer synthesized per mole of neodymium metal and per hour (kg/mol·h).

9) Preparation of the Rubber Compositions:

Two rubber compositions C1 and C2 are prepared. Their formulation is given in Table 2.

For the production of the rubber compositions, the procedure is as follows: the diene elastomer is introduced into an internal mixer (final degree of filling: approximately 70% by volume), the initial tank temperature of which is approximately 110° C., followed by the reinforcing filler, and also the various other ingredients with the exception of the vulcanization system. Thermomechanical working (non-productive phase) is then carried out in one step, which lasts approximately 5 min to 6 min, until a maximum "dropping" temperature of 160° C. is reached. The mixture thus obtained is recovered and cooled and then sulfur and an accelerator of sulfenamide type are incorporated on a mixer (homofinisher) at 25° C., everything being mixed (productive phase) for an appropriate time (for example between 5 and 12 min).

The compositions thus obtained are subsequently calendered in the form of plaques (with a thickness ranging from 2 to 3 mm) or of thin sheets of rubber, for the measurement of their physical or mechanical properties.

The rubber composition C2 is a rubber composition in accordance with the invention, since it contains a diene elastomer according to the invention, the copolymer 1 of Example 4. The rubber composition C1 is a control rubber composition, since it contains the elastomer E1, the copolymer B2 of Example 3.

10) Results:

The average catalytic activities of the catalytic system for each of the copolymer syntheses carried out are shown in Table 1. The characteristics of the copolymers synthesized appear in Table 3. The rheometric properties of the rubber compositions appear in Table 4.

Compared to the copolymers A, B1 and B2, the copolymers 1 to 3 are produced with much higher catalytic activity. The copolymers in accordance with the invention prove to be more advantageous than their homologues, which are the copolymers of ethylene and of 1,3-butadiene, from the point of view of the productivity of a polymer production unit.

Examples 1 to 3 show that, for ethylene contents greater than 70% in the copolymers, the copolymers of ethylene and of 1,3-butadiene are highly crystalline (crystallinity greater than 30%) unless they contain units of cyclic structure such as 1,2-cyclohexanediyl. Conversely, the copolymers in accordance with the invention (Examples 4 to 6), even for ethylene contents much higher than the copolymer of Example 1, are much less crystalline. They have a crystallinity which is comparable to, or even lower than, that of copolymers of ethylene and of 1,3-butadiene containing 1,2-cyclohexanediyl cyclic units (Examples 2 and 3). More particularly, the copolymer 3 in accordance with the invention, even with a molar content of ethylene approaching 80%, is virtually non-crystalline.

Table 4 shows that the composition C2 according to the invention has a T90 that is 10 points lower, which makes it possible to reduce the in-press curing time of the composition by 10%.

In summary, the copolymers in accordance with the invention exhibit a more advantageous compromise of properties than their homologues, which are the copolymers of ethylene and of 1,3-butadiene. The rubber compositions also in accordance with the invention which comprise copolymers according to the invention also exhibit improved curing properties.

TABLE 1

| Copolymerization conditions | Example 1 Copolymer A | Example 2 Copolymer B1 | Example 3 Copolymer B2 | Example 4 Copolymer 1 | Example 5 Copolymer 2 | Example 6 Copolymer 3 |
|---|---|---|---|---|---|---|
| Temperature (° C.) | 80 | 80 | 80 | 40 | 40 | 80 |
| Pressure (bar) | 4 | 4 | 8 | 8 | 8 | 8 |
| Metallocene concentration (mmol/l) | 0.32 | 0.15 | 0.07 | 0.05 | 0.05 | 0.06 |
| Co-catalyst concentration (mmol/l) | 0.97 | 0.8 | 0.36 | 0.22 | 0.22 | 0.26 |
| Gaseous feed mixture composition (mol % Eth/Bde) | 80/20 | 80/20 | 80/20 | — | — | — |
| Feed composition (mol % ethylene/isoprene) | — | — | — | 75/25 | 60/40 | 70/30 |
| Catalytic activity (kg/mol · h) | 92 | 134 | 500 | 706 | 707 | 1250 |

TABLE 2

| Composition | C1 | C2 |
|---|---|---|
| E1 (1) | 100 | — |
| E2 (2) | — | 100 |
| Carbon black (3) | 40 | 40 |
| Antioxidant (4) | 2 | 2 |
| Stearic acid (5) | 1.5 | 1.5 |
| Paraffin wax | 1 | 1 |
| ZnO (6) | 2.5 | 2.5 |
| S | 0.56 | 0.56 |
| CBS (7) | 1.26 | 1.26 |

(1) copolymer B2 of Example 3
(2) copolymer 1 of Example 4
(3) N234

(4) N-(1,3-Dimethylbutyl)-N-phenyl-para-phenylenediamine (Santoflex 6-PPD from Flexsys)
(5) Stearin, Pristerene 4931 from Unicienna)
(6) Zinc oxide, industrial grade from Umicore
(7) N-Cyclohexyl-2-benzothiazolesulfenamide from Flexsys

TABLE 3

| Copolymer characteristics | Example 1 | Example 2 | Example 3 | Example 4 | Example 5 | Example 6 |
|---|---|---|---|---|---|---|
| ethylene unit (mol %) | 73.7 | 71 | 78.3 | 80.7 | 71.8 | 77.1 |
| 1,2 + 1,4 butadiene unit (mol %) | 26.3 | 16 | 13.7 | — | — | — |
| 1,2-cyclohexanediyl unit (mol %) | — | 13 | 8 | — | — | — |
| isoprene unit (mol %) | — | — | — | 19.3 | 28.2 | 22.9 |
| 3,4 isoprene unit (mol %) | — | — | — | 15.7 | 23 | 17.1 |
| 1,2 isoprene unit (mol %) | — | — | — | 0.3 | 0.4 | 0.4 |
| 1,4 isoprene unit (mol %) | — | — | — | 3.3 | 4.8 | 5.4 |
| 1,4-trans isoprene unit/isoprene unit | — | — | — | 17% | 17% | 23.5% |
| 3,4 isoprene unit/isoprene unit | | | | 81% | 81% | 74% |
| 3,4 and 1,2 isoprene unit/isoprene unit | | | | 83% | 83% | 76.5% |
| crystallinity (%) | 31 | 0 | 5 | 7 | 0 | <1 |
| Mn (g/mol) | — | 62 600 | 181 000 | 120 000 | 92 000 | 56 000 |
| PI | — | — | 1.45 | 2.29 | 1.89 | 2.03 |
| Tg/ΔT | −54 | −35 | −40/9 | −45/8 | −45/5 | −48/6 |
| stiffness (MPa) | — | — | 1.2 | 1.2 | 1.1 | 1.2 |

TABLE 4

| Composition | C1 | C2 |
|---|---|---|
| T90 | 100 | 90 |

The invention claimed is:

1. A copolymer of ethylene and of isoprene, the copolymer comprising from 15 to 30 mol % of isoprene units, at least 70% of which are in the 3,4 configuration and a portion of which is in the 1,2 configuration, the copolymer being a statistical copolymer and having a glass transition temperature of less than −35° C.

2. The copolymer according to claim 1, in which the isoprene units in the 3,4 configuration and the isoprene units in the 1,2 configuration represent at least 75 mol % of the isoprene units of the copolymer.

3. The copolymer according to claim 1, which copolymer contains isoprene units in the 1,4-trans configuration.

4. The copolymer according to claim 1, wherein the copolymer includes at least 65 mol % ethylene units.

5. The copolymer according to claim 1, which copolymer has a glass transition temperature of between −60° C. and −35° C.

6. The copolymer according to claim 1, which copolymer is an elastomer.

7. A process for the preparation of a copolymer of ethylene and of isoprene defined in claim 1, which comprises the copolymerization of ethylene and of isoprene in the presence of a catalytic system based at least on a metallocene of formula (I) and on an organomagnesium compound of formula (II)

$$P(Cp^1)(Cp^2)Nd(BH_4)_{(1+y)}L_y\text{-}N_x \quad (I)$$

$$MgR^1R^2 \quad (II)$$

$Cp^1$ and $Cp^2$, which are identical or different, being selected from the group consisting of substituted fluorenyl groups and the unsubstituted fluorenyl group of formula $C_{13}H_8$, P being a group bridging the two $Cp^1$ and $Cp^2$ groups and representing a $ZR^3R^4$ group, Z representing a silicon or carbon atom, $R^3$ and $R^4$, which are identical or different, each representing an alkyl group comprising from 1 to 20 carbon atoms, y, which is an integer, being equal to or greater than 0, x, which is or is not an integer, being equal to or greater than 0, L representing an alkali metal selected from the group consisting of lithium, sodium and potassium, N representing a molecule of an ether, $R^1$ and $R^2$, which are identical or different, representing a carbon group.

8. The process according to claim 7, in which the metallocene is of formula (Ia), (Ib), (Ic), (Id) or (Ie)

$$[\{Me_2SiFlu_2Nd(\mu\text{-}BH_4)_2Li(THF)\}_2] \quad (Ia)$$

$$[Me_2SiFlu_2Nd(\mu\text{-}BH_4)_2Li(THF)] \quad (Ib)$$

$$[Me_2SiFlu_2Nd(\mu\text{-}BH_4)(THF)] \quad (Ic)$$

$$[\{Me_2SiFlu_2Nd(\mu\text{-}BH_4)(THF)\}_2] \quad (Id)$$

$$[Me_2SiFlu_2Nd(\mu\text{-}BH_4)] \quad (Ie)$$

the symbol Flu presenting the fluorenyl group of formula $C_{13}H_8$.

9. The process according to claim 7, in which W and $R^2$ contain from 2 to 10 carbon atoms.

10. The process according to claim 7, in which W and $R^2$ each represent an alkyl.

11. The process according to claim 7, in which the organomagnesium compound is a dialkylmagnesium compound.

12. The process according to claim 7, in which the ethylene and the isoprene are added continuously during the copolymerization.

13. A rubber composition which comprises the elastomer defined in claim 6.

14. The rubber composition according to claim 13, which rubber composition comprises a crosslinking system.

15. The rubber composition according to claim 13, which rubber composition comprises a reinforcing filler.

16. A tire which comprises the rubber composition defined in claim 13.

17. The copolymer according to claim 5, which copolymer has a glass transition temperature of between −55° C. and −40° C.

18. The process according to claim 11, in which the organomagnesium compound is butylethylmagnesium or butyloctylmagnesium.

\* \* \* \* \*

UNITED STATES PATENT AND TRADEMARK OFFICE
CERTIFICATE OF CORRECTION

PATENT NO. : 12,043,680 B2
APPLICATION NO. : 16/972360
DATED : July 23, 2024
INVENTOR(S) : José-Carlos Araujo Da Silva et al.

It is certified that error appears in the above-identified patent and that said Letters Patent is hereby corrected as shown below:

In the Claims

Column 15, Claims 9 and 10, Lines 1 and 3:
"Wand" should read "$R^1$ and"

Signed and Sealed this
Seventeenth Day of September, 2024

Katherine Kelly Vidal
*Director of the United States Patent and Trademark Office*